April 13, 1965    L. CARDWELL    3,178,036
FRICTION DRAFT GEAR
Filed Dec. 3, 1962    5 Sheets-Sheet 1

Inventor
Lloyd Cardwell
By
Mann, Brown & McWilliams
Attys.

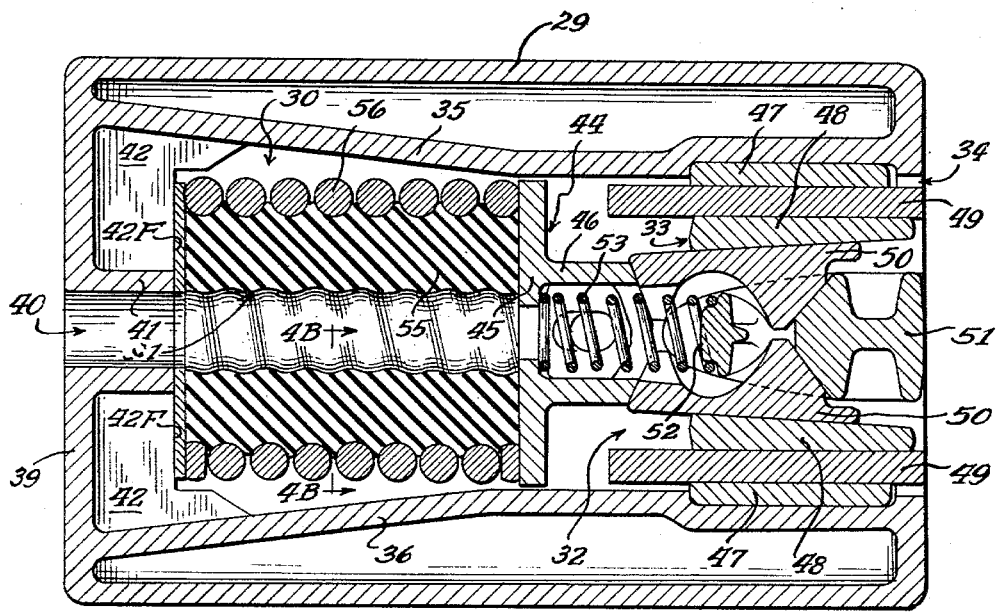
Fig. 3.
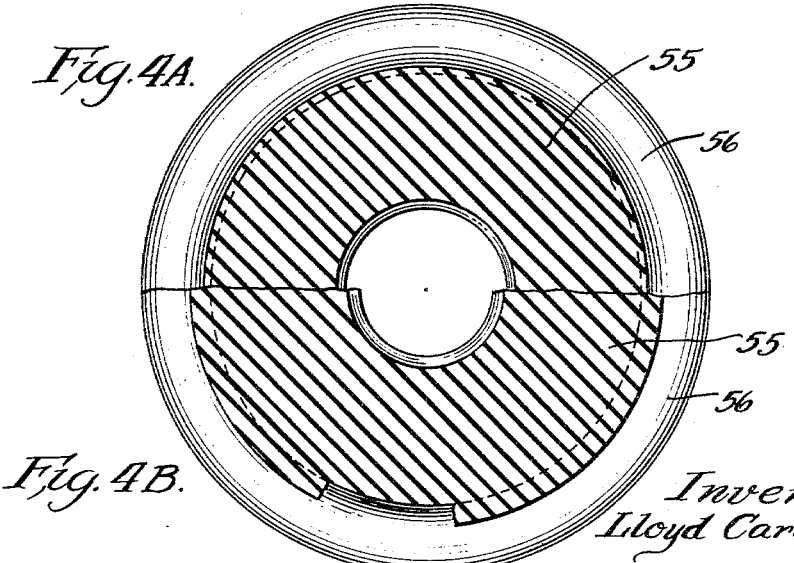
Fig. 4A.
Fig. 4B.
Inventor
Lloyd Cardwell
By Mann, Brown & McWilliams
Attys.

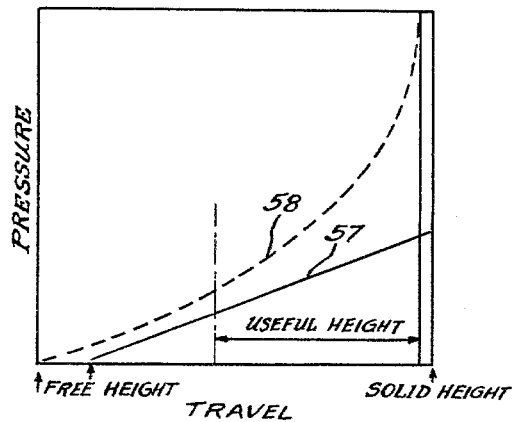
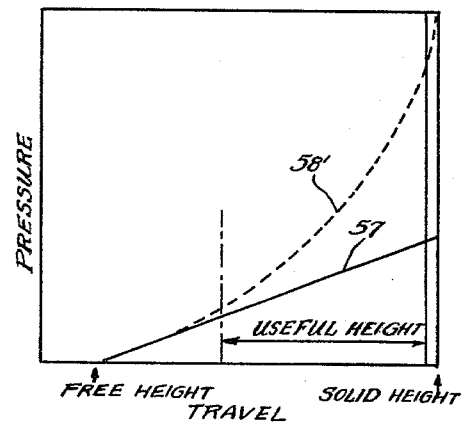
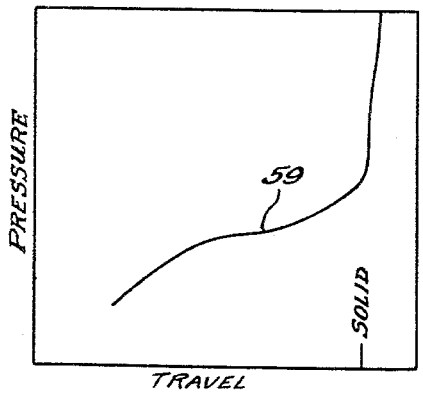
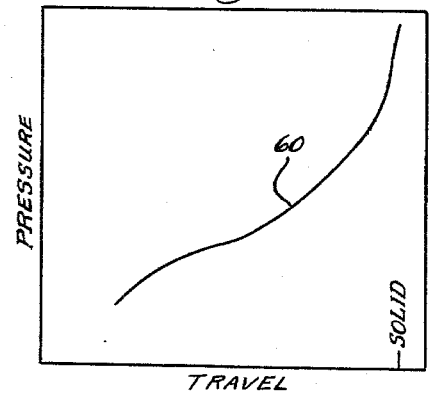
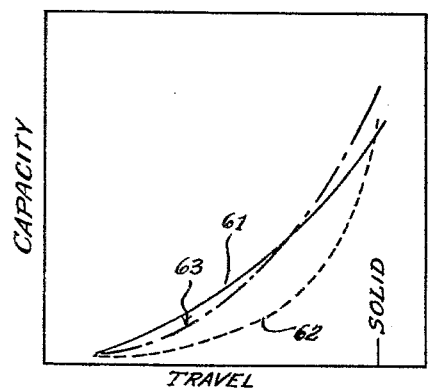

April 13, 1965　　　　　L. CARDWELL　　　　　3,178,036
FRICTION DRAFT GEAR
Filed Dec. 3, 1962　　　　　　　　　　　　　　5 Sheets-Sheet 4

Inventor
Lloyd Cardwell
By Mann, Brown & McWilliams,
Attys.

Inventor
Lloyd Cardwell
By Mann, Brown & McWilliams
Attys.

United States Patent Office 3,178,036
Patented Apr. 13, 1965

3,178,036
FRICTION DRAFT GEAR
Lloyd Cardwell, Chicago, Ill., assignor to Cardwell
Westinghouse Company, a corporation of Delaware
Filed Dec. 3, 1962, Ser. No. 242,580
9 Claims. (Cl. 213—33)

This application is filed as a continuation-in-part of my copending application, Serial No. 100,397, filed April 3, 1961, now abandoned, as a continuation-in-part of then pending application Serial No. 57,690, filed September 22, 1960, the disclosure of each of which is hereby specifically incorporated by reference.

This invention relates to an improved friction draft gear arrangement and more particularly is concerned with a novel draft gear arrangement wherein a composite spring mechanism comprised of coacting, interengaged, rubber and coil spring elements is arranged to cushion a friction clutch mechanism that sets up friction forces in proportion to the basic closure characteristic of the spring mechanism for providing a multiplied result of the closure characteristic of the spring mechanism.

Each of the three principal types of draft gear now in general use: the coil spring type fricion draft gear; the rubber pad type of friction draft gear; and the pure rubber pad type of draft gear; have certain limitations and objectionable features.

The coil spring type of friction draft gear, while offering low reaction and low recoil, is limited in capacity and with the occurrence of oversolid blows (that is, blows of greater energy than the capacity of the gear) the forces applied to the car frame become extremely high and are destructive to both the car and the lading.

Undesirable features of draft gears that incorporate rubber pads, whether used alone or in combination with friction elements are; that the rubber pads offer little capacity during initial closure travel; that the rubber pads have low energy absorption characteristics and have correspondingly high recoil forces; and that with rubber pads, the force-time application approaches a static loading characteristic.

The principal object of this invention is the provision of a draft gear that eliminates the above disadvantages.

Another object of the invention is the provision of a draft gear construction for blending the best features of rubber and coil spring elements.

A related object of the invention is the provision of a high capacity draft gear having high absorption and low recoil.

Still another object of the invention is the provision of a friction draft gear having high ultimate capacity for reducing or eliminating oversolid blows.

Briefly, the objects of the invention are accomplished by providing a draft gear having a composite rubber and coil spring unit acting against a friction clutch that sets up in accordance with the closure resistance of the composite unit so that the closure characteristics of the composite unit are multiplied in the friction clutch. The composite unit comprises a tubular rubber core or sleeve encased within a helical coil spring that limits outward rubber flow to give required closure resistance to the unit and that accommodates inward rubber flow to achieve a smooth pressure build up in the unit.

A composite unit of this form exhibits an advantageous closure characteristic that is peculiarly suitable for improving the performance of a friction draft gear. Moreover, the unit has marked versatility in that its closure characteristic may be tailored to meet specific needs by elementary changes in design. For example, where high capacity and firm initial resistance to travel are desired for freight car application, the rubber core may have a somewhat greater free height than the coil spring for mounting under substantial initial compression; however, where soft starting action is desirable such as in passenger equipment, a short rubber core in relation to the free height of the coil spring is used and if the same ultimate capacity is to be mantained the shorter rubber core may be formed with a smaller central opening. In fact, any desired closure characteristic for a coil spring and rubber core unit may be attained by appropriately interrelating the O.D., the I.D., and the free heights of the rubber core and the coil spring elements.

Other objects and advantages of the invention will be apparent during the course of the following description.

In the accompanying drawings forming a part of this specificaion and in which like numerals are employed to designate like parts throughout the same:

FIG. 3 is a view similar to that of FIG. 1 and showing the draft gear in closed position;

Figure 1:
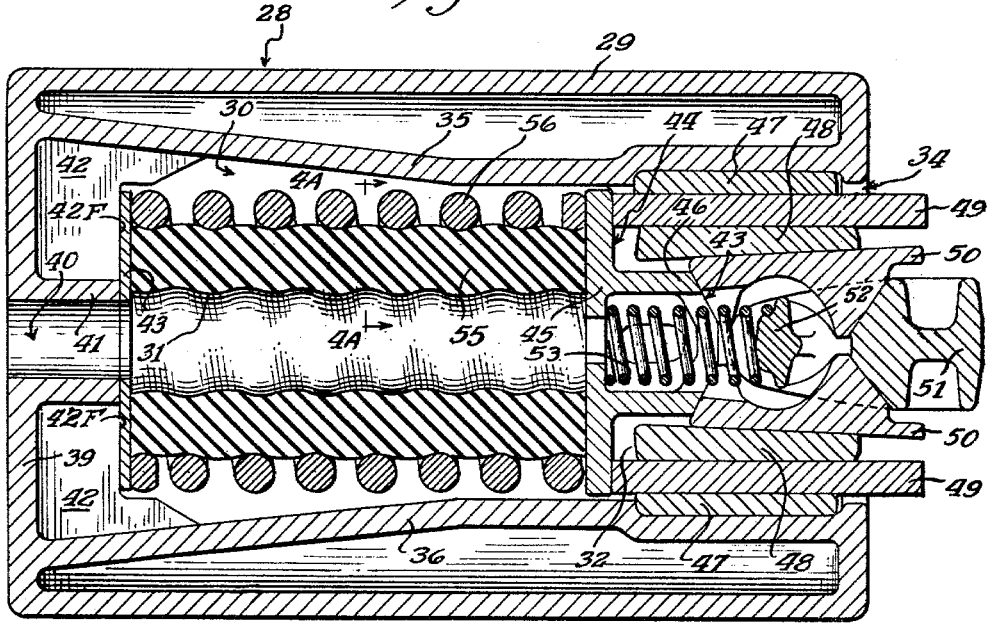
FIG. 1 is a horizontal sectional view through a draft gear constructed in accordance with the present invention with the gear being shown in full release position.
Figure 5:
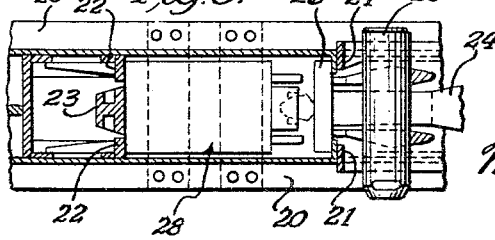
Figure 11:
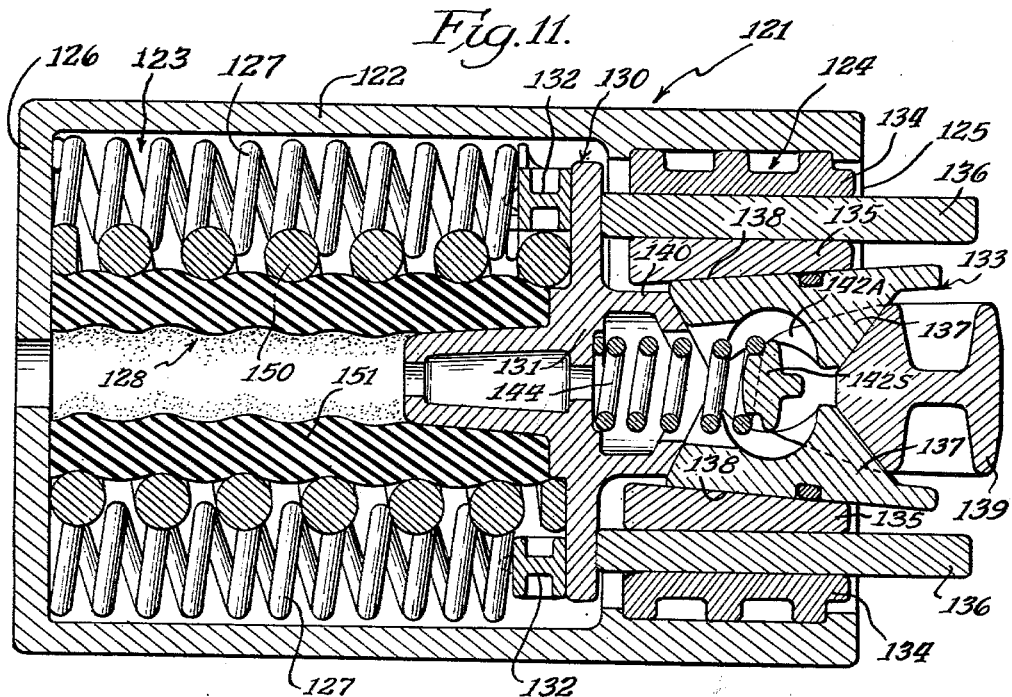
Figure 12:
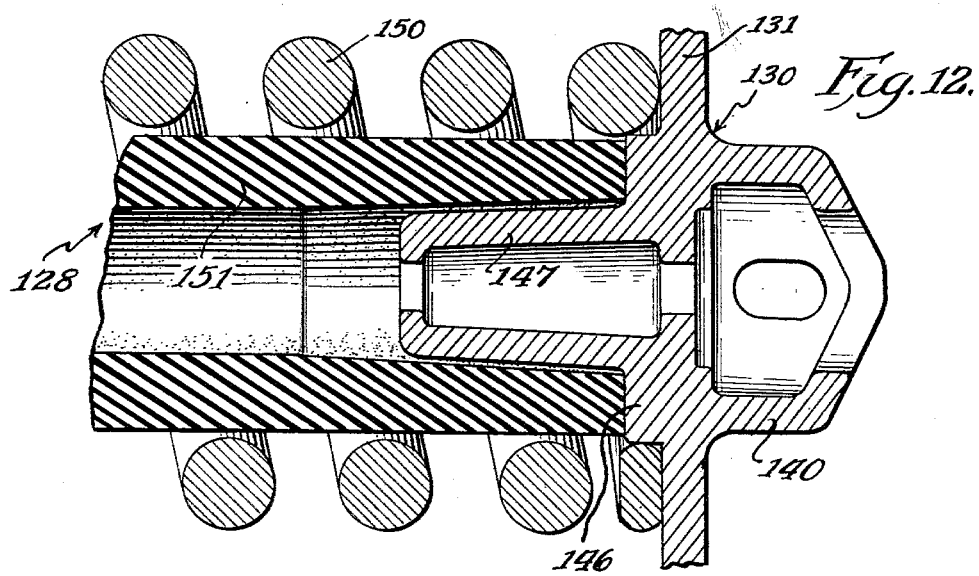
Figure 13:
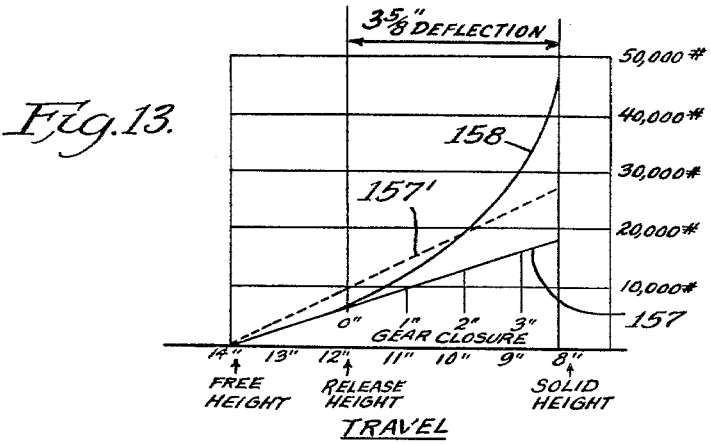
Figure 14:
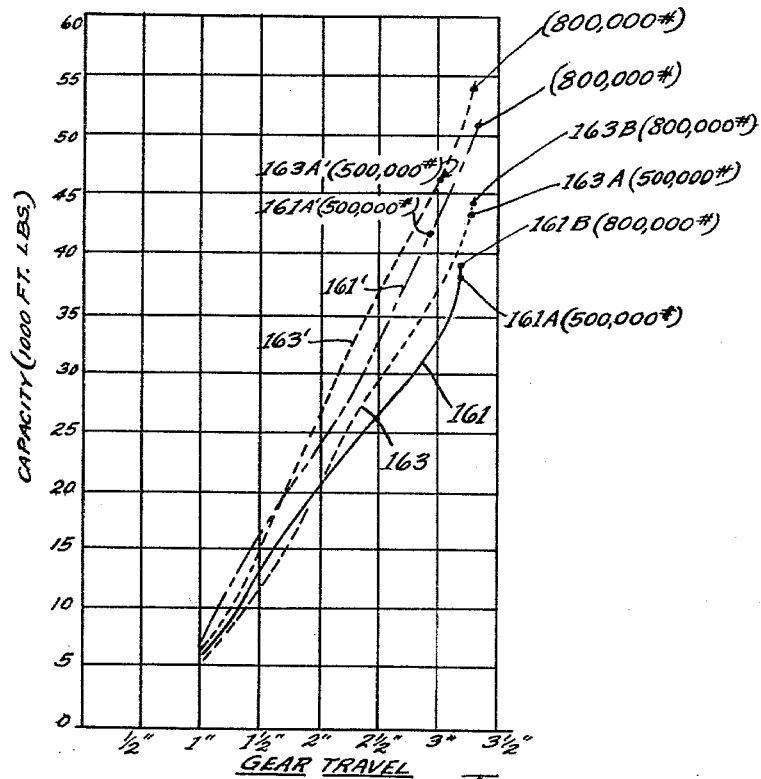

FIGS. 4A and 4B comprise a composite vertical cross-sectional view taken, respectively, on the lines 4A—4A of FIG. 1 and 4B—4B of FIG. 3;

FIG. 5 is a reduced horizontal section through familiar parts of a railway freight car showing the draft gear mounted in a draft gear pocket in association with the coupler yoke of the draft gear rigging;

FIGS. 6 to 10 are illustrative force closure curves illustrating the principles and advantages of this invention;

FIG. 11 is a horizontal sectional view through an improved form of draft gear constructed in accordance with the present invention; and FIG. 12 is an enlarged fragmentary sectional view illustrating the mating configuration of the nesting portions of the intermediate follower and composite rubber and coil spring unit of the FIG. 11 arrangement;

FIG. 13 is a spring deflection diagram showing the deflection curve of the composite spring unit utilized in accordance with this invention compared with the deflection curve of a typical multiple coil spring unit as used in prior art draft gears; and FIG. 14 is a capacity vs. gear travel diagram showing the capacity curves derived from actual tests of a draft gear equipped with a composite spring unit having deflection characteristics as shown in FIG. 13 and of a draft gear equipped with a multiple coil spring unit having deflection characteristics as shown in FIG. 13.

For completeness of disclosure, the draft gear of this invention is shown in FIG. 5 mounted in a draft gear pocket in association with the familiar surroundings of center sills 20, front and rear draft gear lugs or stops 21 and 22, respectively, and a vertical yoke 23 connected to a coupler shank 24 by a horizontal draft key 25, with a conventional front follower 26 disposed within the yoke 23 to abut against the front lugs 21.

The draft gear illustrated herein for purposes of disclosure is designated generally at 28 and includes a casing 29 having a rear chamber 30 for a spring mechanism designated generally as 31 and a front chamber 32 for any suitable type of friction clutch mechanism which is generally designated as 33, with the front and rear chambers being in open communication and with the casing having an opening 34 through its front end.

The casing illustrated herein for purposes of disclosure has a side wall 35, an opposed side wall 36, and top and bottom walls 37 and 38, respectively, and these walls blend into each other to form a reinforced tubular structure. The rear or inner end of the casing is closed by a rear wall or follower 39 that is substantially flat on its exterior to cooperate with the rear draft lugs 22. There is an axial opening 40 through the rear wall 39 and an integral tube or stub 41 projects inwardly in encircling concentric relation to this opening and is connected to the sides and rear of the casing by a series of transversely radiating ribs 42. The ribs 42 have internal end faces 42F aligned flush with the inner end face of the tube 41 to provide a reinforced abutment structure for a ring-like spring seat 43.

The flaring portions of the casing walls 35, 36, 37 and 38 towards the rear of the casing encircle and define the rear chamber 30 in which the spring mechanism is located. Correspondingly, the forward portions of these walls encircle and define the front chamber 32 in which the friction clutch mechanism is located.

A composite intermediate follower and wedge member 44 is located intermediately of the spring mechanism and the friction clutch and includes a base plate 45 providing a front seat for the spring mechanism 31 and a cup shaped formation 46 providing a rear wedge for the friction clutch.

The friction clutch mechanism illustrated herein for purposes of disclosure includes groups of intercalated friction plates with the plates 47 and 48 being stationary and the plates 49 being movable. The stationary plates 47 and 48 are of conventional structure and may be arranged and mounted similar to the plates 5 and 6 shown in Campbell Patent No. 2,814,392. It should be noted that the stationary plates 47 and 48 provide stationary friction surfaces within the casing and extending in generally lengthwise slightly convergent relation toward the closed end. Similarly the movable plates 49 may be arranged and mounted like the plates 8 in the aforesaid Campbell patent. A pair of transversely spaced apart wedge shoes 50 are disposed between the innermost stationary plates 48 and have transversely outwardly facing friction surfaces on these stationary plates. The wedge shoes 50 have forwardly facing wedge surfaces cooperating with similar wedge surfaces on a front thrust wedge of plunger 51 and rearwardly facing wedge surfaces cooperating with corresponding surfaces on the forward end of the generally cup-shaped wedge formation 46 that is integral with and projects forwardly from the base plate 45 of the intermediate follower. A release spring 53 is seated within the cup-shaped rear wedge to react against an inwardly offset spring seat 52 carried integrally on the plunger and to continuously urge the plunger outwardly toward its release position.

When the gear is subjected to high shock loads the forces are transmitted through the front wedge or plunger 51 moving it inwardly relative to the casing and causing it to act through the wedge shoes 50 and the rear wedge 46 on the intermediate follower to drive the intermediate follower inwardly relative to the casing for compressing the spring mechanism. It should be noted that the convergent friction surfaces defined by the plates 48 causes the wedge parts to separate longitudinally of the casing during closure, thus causing multiplied movement of the rear wedge 46 and the intermediate follower. Therefore, the spring mechanism is compressed a distance greater than the travel of the plunger 51.

A proportionate amount of the applied forces is translated into lateral forces transmitted through the wedge shoes 50 to the friction plates to set up lateral loads between the parts of the friction system of the gear. The extent to which the friction system becomes loaded laterally and hence the extent to which it dissipates energy is governed by the closure characteristic of the spring mechanism and in fact the friction system acts to multiply the effect of the closure resistance of the spring mechanism.

In accordance with the present invention, the draft gear is given a new and improved closure characteristic by virtue of the closure resistance developed within the spring mechanism and acting to set up lateral loading in the friction system which multiplies the effect of the spring mechanism.

In accordance with the present invention, the spring mechanism comprises an elongated tubular core 55 of rubber or other equivalent material and an elongated helical coil spring 56 encircling the core and extending in lengthwise coextensive relation therewith to house and confine the core against lateral outward bulging under compression thereof while accommodating lateral inward flow for achieving a desirable closure characteristic.

During lengthwise compression of the composite rubber core and coil spring unit, these elements deflect uniformly so that their laterally contacting portions tend to move simultaneously and hence do not develop an appreciable rubber scrubbing action therebetween such as would deteriorate the core element. The tubular form of the rubber core affords adequate internal clearance to accommodate all requisite internal rubber flow for providing a closure characteristic in the rubber that is essentially the natural hysteresis curve of rubber rather than a hybrid characteristic having appreciable rubber scrubbing effects in it.

It will be apparent that the coil spring which encases the rubber core automatically adapts itself to the changing shape of the core and represents a truly ideal housing in which the rubber may be compressed under confinement for developing high capacity without, however, subjecting the core to scrubbing effects. It will also be apparent that as the compression of the spring mechanism proceeds there is an increased tendency to extrude the rubber material outwardly, however, the coils are progressively brought together to reduce the available space through which the rubber material can extrude. At a near solid position of the coil spring 56, the rubber extends almost to the midpoint between the adjacent coils (see FIGS. 3 and 4B). Thus, the rubber is tightly enclosed within its coil spring housing and when the unit is compressed, the rubber core develops tremendous pressure in all directions to greatly increase the ultimate capacities of the elements that comprise this composite spring mechanism.

Pressure travel curves are shown in FIG. 6 to illustrate the dramatically increased capacity which the composite unit exhibits in comparison with a straight coil spring unit. The curve labeled 57 represents the familiar pressure travel characteristic of a helical coil spring and the curve labeled 58 represents the corresponding characteristic of a composite spring unit having a tubular rubber core encased within the same coil spring that is depicted by curve 57. In this illustration, the rubber core is indicated as having a greater free height than the coil spring so that when in place within the gear it is under substantially greater initial pressure and develops maximum capacity such as would be desired in freight car equipment. In FIG. 7, curve 58 is derived for a composite spring unit wherein the free height of the coil spring and of the rubber core are identical.

It may be noted from the comparison of the pressure travel curves of FIGS. 6 and 7 that the unit enables the gear to minimize the shock effect resulting from the application of oversolid blows. In the composite unit, the ultimate forces developed in the spring mechanism are much greater than in a coil spring alone and the closure curve for the composite unit rises rapidly enough to, in effect, blend in with solid pressure relationships, this blending thus eliminates the sudden shock effects.

As stated previously for the purpose of achieving high capacity and high absorption with low recoil, the composite spring mechanism is combined with a friction clutch mechanism which sets up lateral loads in proportion to the closure resistance of the spring mechanism itself so that the friction clutch acts to multiply the capacity provided in the spring mechanism and utilizes the thus developed capacity to generate high energy absorption.

While a preferred form of friction clutch is illustrated herein for purposes of disclosure, it will be apparent that the invention may be embodied in draft gears having friction clutches of other physical arrangements. The important feature being, however, that the clutch be of a type that translates the longitudinal forces which are developed due to the reaction of the composite spring mechanism into lateral forces for developing high frictional pressures in the friction clutch. By way of illustration, one such friction clutch mechanism is shown in Cardwell Patent No. 2,496,442. Many other friction systems of this same general type are in use today and are known to those skilled in this art and are also contemplated in accordance with the general teachings of this invention.

In FIG. 8 curve 59 illustrates the pressure travel characteristics of a conventional coil spring type friction draft gear whereas the improved pressure travel characteristics of the present draft gear are shown by curve 60 in FIG. 9.

Finally, in FIG. 10, comparative curves illustrating the capacity-travel characteristics are shown. Curve 61 representing a draft gear having a friction clutch working against a coil spring, curve 62 representing a draft gear having only rubber pads and curve 63 representing a draft gear having a friction clutch working against the composite spring unit in accordance with the present invention. As is apparent from FIG. 10, the coil spring type friction draft gear is unduly limited in capacity and, as usual, it is subject to sudden shock from oversolid blows. The rubber pad gear has low capacity during the first part of its travel and since it lacks energy absorption, has high recoil. The gear equipped with the composite unit eliminates the disadvantages of both the other gears and offers high capacity and high absorption and correspondingly low recoil. Its design may readily be correlated so that the sudden shock of oversolid blows is reduced or even completely eliminated.

It will be apparent from a consideration of FIG. 10 that the curve 63 representing the capacity-travel characteristic for a draft gear employing a composite spring unit in accordance with this invention is softer at short travel ranges and gives greater capacity for longer travel ranges. Thus, the curve 63 is shown crossing curve 61 which corresponds to the same type of draft gear except a conventional multiple coil spring unit is employed rather than a composite spring unit. Since the gears corresponding to curves 61 and 63 are otherwise identical, the crossing of the capacity curves results from the fact that the deflection curve for the composite spring unit crosses the deflection curve for the prior art multiple coil spring unit which it replaces. Thus, the deflection curve for the composite spring unit is softer initially and rises ultimately to a much higher force value. In FIG. 6 the curve 57 represents a single coil spring whereas the curve 58 represents the composite spring unit which includes the effect of the coil spring represented by curve 57 plus the effect of the rubber core insert. The deflection curve for a multiple coil prior art spring would begin at an initial value above the initial value of curve 58 and would terminate at an end value substantially less than the end value of curve 58.

In the normal practice of the invention, it is contemplated that the opening of the rubber core should never be fully closed under maximum compression so that the rubber core never reaches a solid state and this always accommodates additional movement of the coil spring.

An improved form of draft gear is designated generally at 121 in FIG. 11 and includes a housing 122 having a rear chamber 123 for spring cushioning elements and a front chamber 124 for a friction clutch device, with the front and rear chambers being in open communication and with the housing, or casing, having an opening 125 through its front end.

The draft gear housing 122 is a rectangular hollow steel casting having an integral rear wall 126 that provides a seat for a set of four corner coil springs 127 and a central composite coil spring and rubber core unit 128 that extends collaterally in the rear chamber with the corner coil springs.

An intermediate follower and wedge member 130 is located forwardly of the spring cushioning elements in the rear chamber and includes a base plate 131 shaped to provide a spring seat for the elements of the composite spring unit, with auxiliary spring seats 132 being mounted between the corner springs and the base plate 131. A friction clutch mechanism 133 (similar to that shown at 33 in FIG. 1) is mounted in the front chamber of the housing and includes groups of intercalated plates of which plates 134 and 135 are stationarily mounted in the housing and plates 136 are movable. A pair of laterally spaced apart wedge shoes 137 having oppositely outwardly facing surfaces 138 are mounted between the stationary plates 135 for frictional sliding engagement thereagainst. The wedge shoes have forward wedge surfaces cooperating with similar wedge surfaces on a central plunger or thrust wedge 139 and rearward wedge surfaces cooperating with like surfaces formed on the forward end of a generally box shaped casting portion 140 that is formed integrally with and projects forwardly from the base plate 131.

The central plunger 142 includes transversely spaced rearwardly extending arms 142A that are bridged by a transverse spring seat 142S that forms a seat for a release spring 144, the other end of which seats in the boss shaped casting portion 140 of the intermediate follower and wedge.

Figure 2:
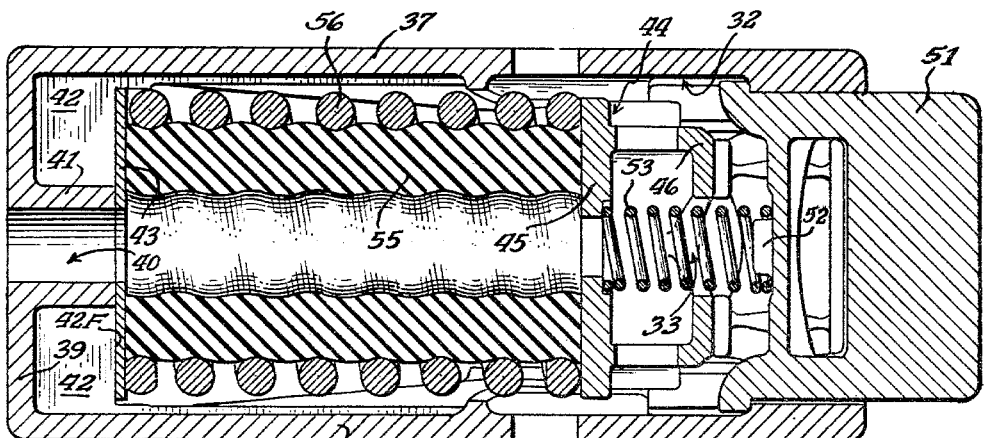
FIG. 2 is a vertical sectional view through the draft gear also showing the gear in full release.

The composite rubber core and coil spring unit 128 operates in the FIG. 11 arrangement in essentially the same fashion as it does in the FIG. 1 to FIG. 3 arrangement. Once again, a proportionate amount of the applied longitudinal forces is translated into lateral forces through the wedge shoes 137 of the friction clutch to load the friction plates 134, 135 and 136 in the friction system of the gear. Thus, the friction system acts to multiply the effect of the resistance to closure offered by the spring elements 127 and 128.

An important feature of the action of the composite spring unit is its ability to offer greatly increased resistance during its final increment of closure travel. This feature permits the gear to be arranged initially so as to reach its required reaction force level at about ¼" short of full gear closure. This approach allows for the fact that usage of the gear for a period of time permits rust and other factors to cause a decrease in the coefficient of friction between the elements of the friction clutch unit 133. This condition progressively leads to a loss of capacity; however, in the present arrangement, this loss is compensated by reason of the ability of the composite unit 128 to increase its resistance to closure by as much as 35% during the final ¼" of travel.

In the draft gear arrangement of FIG. 11 the corner coil springs 127 contribute importantly to the overall capacity of the gear; however, they do not contribute appreciably to its ability to compensate for decreasing coefficients of friction caused by rust and the like. It will be apparent, therefore, that the corner coil springs may be omitted without departing from the principles of this invention.

Another common difficulty encountered in draft gears incorporating friction clutch units is eliminated by the particular arrangement of the composite rubber core and coil spring unit of FIG. 11. In a typical gear closure under impact the two movable plates 136 are driven inwardly through the pairs of stationary plates 134 and 135. During this action, the central wedging system consisting of the plunger or center wedge 139 and the wedge shoes 137 develops tremendous lateral pressures between the movable plates and the two stationary plates. When two steel surfaces move in sliding contact and under great pressure, the points of contact become extremely hot and at times the plates may become temporarily welded together.

Normally, the main cushioning spring elements acting in conjunction with the release spring 144 are capable of breaking free these weld spots, however, if the intermediate follower 130 is not positively constrained to maintain its base plate 131 perpendicular to its direction of travel, it will occur that one side of the friction clutch will break loose first and permit the intermediate follower to tip. This tipping action of the intermediate follower will cause one wedge shoe to lock and the friction parts are then stuck together with the gear partially compressed and hence partially inoperative. This exposes both the car and the lading to severe damage.

This sticking or locking condition is eliminated in the arrangement of FIGS. 11 and 12 by providing the intermediate follower or spring seat 130 with a rearwardly extending central projection 146 of circular form arranged to fit snugly in centering guide relation within the front end coil of the coil spring element 150 and by providing a frusto-conical stem 147 centrally of the circular projection 146 and extending rearwardly therefrom to engage in a correspondingly tapered recess in the front end of the tubular rubber core 151.

As illustrated in FIG. 12 when the parts are free of stress, the recess in the core 151 is slightly larger than the stem 147 on the intermediate follower. However, when the composite unit is under initial compression within the gear, the integral stem of the intermediate follower is held tightly by the rubber core to positively prevent tipping. The greater the compression the tighter the grip on the stem. The tapered configuration of the core and stem has the additional advantage of preventing creepage of the rubber over the surface of the stem and this eliminates scrubbing such as would lead to excessive wear and deterioration.

In the preferred constructional embodiment of the gear shown in FIG. 11 wherein the gear closure travel is on the order of 3¼", the spring system undergoes a total deflection on the order of 3⅝", with the differential in travel of ⅜" being developed by the action of the friction clutch parts which are spread apart lengthwise in response to lateral squeezing thereof occasioned by movement through an inwardly tapering friction surface configuration. This characteristic of the friction clutch shown in FIG. 11 is well known and this closure action is shown in FIGS. 5 and 6 of Campbell Patent 2,814,392.

In FIG. 13 a force deflection diagram is shown wherein curve 157 represents the force vs. deflection characteristic of a single coil spring, namely that one which is shown at 150 in FIGS. 11 and 12 and wherein curve 157' represents the force deflection characteristic of a spring unit having the outer coil spring 150 equipped with an inner coil spring in the usual fashion. Finally, curve 158 in FIG. 13 represents the force deflection characteristic of the composite spring unit 128 shown in FIGS. 11 and 12. From the diagram it will be apparent that each of the spring elements has a free height of 13⅞" and the gear arrangement is such that when the spring elements are disposed therein and the gear is in release position each spring element is precompressed to define a release height of 11⅞".

When the composite spring unit is compressed to its release height, that is, when the gear is in its normal release position, the core has surface contact radially outwardly against the coil spring to enable the coil spring to house and confine the core against lateral outward bulging during compression of the gear. When the gear is closed, the springs have been compressed an additional 3⅝" beyond their release height to where the coil spring closely approaches its indicated solid height of 8¼". The central passage of the core may be termed ever-open in that, even at maximum compression of the coil spring, there remains a central opening allowing room for additional radial inward flow of the core material. It may be observed that the curve 158 beings lower than the curve 157' crosses it after about 2" of gear closure travel and then rises to a substantially greater value.

Capacity curves for the gear of FIG. 11 are shown in FIG. 14. Curve 163 represents the results of an official capacity test and curve 163' represents the results of a final capacity test (after sturdiness). On curve 163 the point 163A represents the capacity developed at the time the reaction force reaches 500,000 pounds and it will be noted that at this time the gear has completed substantially its full travel so that no additional capacity could even be derived by working the gear to a reaction force of 800,000 pounds which is indicated at point 163B on curve 163.

Curve 161 is a capacity curve showing the results of an official capacity test run upon a substantially identical gear except using a spring unit of the type represented by the line 157' in FIG. 13. This prior art gear also develops substantially full capacity at its full travel without exceeding a reaction force of 500,000 pounds as indicated at point 161A and thus it develops no greater capacity where the reaction force is run up to 800,000 pounds as indicated at point 161B. Curve 161' is a final capacity test (after sturdiness) for the prior art gear using the spring arrangement as defined in curve 157' of FIG. 13.

It should be noted that the official capacity tests were run on gears when the gears were in an initially rusty condition whereas the final capacity test is run after sufficient testing has taken place that the parts of the friction clutch are clean and acting at a higher coefficient of friction. Therefore, the final capacity test develops greater capacity due to the clean parts in the gear. It should be noted that as indicated at the point 161A' the prior art gear reached a 500,000 reaction force level at less than 3" of travel and this gives a maximum useful capacity after sturdiness of 41,820 foot pounds. The gear of this invention develops over 3" of travel in the final capacity test as indicated by the point 163A' and this gives a maximum useful capacity of 46,875 foot pounds. More complete data comparing the prior art gear with the gear of FIG. 11 appears in the following table.

| A.A.R. Tests Based on Average of 5 Gears | Prior Art Gear | | Fig. 11 Gear | | Percent Increase in capacity |
|---|---|---|---|---|---|
| Official Capacity | 3.33" | 38,940 | 3.32" | 44,000 | 14 |
| After 5 Million Ft. Lbs | 3.13" | 40,220 | 3.31" | 47,500 | 17 |
| After 15 Million Ft. Lbs | 2.96" | 41,600 | 3.32" | 52,100 | 25 |
| After 25 Million Ft. Lbs | 2.96" | 42,420 | 3.30" | 56,400 | 33 |
| Final Capacity (After Sturdiness) | 2.88" | 41,820 | 3.02" | 47,100 | 13 |

The percentage improvements in favor of the gear of FIG. 11 derive from the action in the draft gear combination of the composite spring unit. In particular, the composite spring unit is selected to provide a force deflection characteristic that is compatible with the friction clutch such that the gear may develop the full designed travel at high energy dissipation. The marked build-up of the spring resistance for the gear of FIG. 11 is attributable to the confining action of the coil spring on the rubber element and the ability of the gear to develop its full travel results from the use of a hollow rubber element of appropriate size and shape to the condition of going solid on the rubber. The relative precompression of the spring unit is apparent from the diagram of FIG. 13 and it, too, is an important factor in the development of full travel at high capacity.

Friction gears, if in a rusty condition, have been known to occasionally slip through without developing full capacity. The steeply rising deflection curve of the composite spring unit such as is used in FIG. 11 enables the present gear to react strongly enough to overcome this possibility of slip-through. The reaction of the composite spring unit becomes so marked at increasing deflection that it compels the friction parts to inter-engage under circumstances where they might otherwise have tended to slip through. This is an important safety factor for the gear. More important, however, is the substantial increase in effective capacity that is obtained from the particular draft gear combination disclosed herein.

What is claimed is:

1. In a draft gear arrangement for mounting in the draft pocket of a railway car frame, said pocket having front and rear stops, said arrangement including a casing of a length substantially less than the distance between said stops and extending longitudinally in said pocket, a cushioning mechanism in said casing and reacting longitudinally between said stops through engagement with front and rear follower means, said cushioning mechanism including spring mechanism extending longitudinally in said casing and abutting one of said follower means, a friction clutch mechanism extending longitudinally in said casing and abutting the other of said follower means, and means for transmitting forces between said spring mechanism and said friction mechanism, said friction clutch mechanism including means for multiplying the closure travel of said spring mechanism relative to the closure travel of said front and rear follower means and means for translating a proportional amount of longitudinal force applied to the gear into friction creating forces resisting gear closure such that the closure resistance of said spring mechanism is multiplied in said friction clutch mechanism, said spring mechanism, when said arrangement is in release position, being precompressed to a predetermined extent to define a release height; said gear ararngement being of a type wherein said spring mechanism conventionally comprises a multiple coil metal spring unit including an outer coil spring having a free height substantially greater than said release height and having a solid height substantially less than said release height; the improvement wherein said spring mechanism comprise a composite spring unit including said outer coil spring and a tubular core of rubber-like material disposed in lengthwise relation within said outer coil spring and having a free height corresponding to the free height of said outer coil spring to provide said composite unit with a reaction force, at said release height, that is less than the reaction force of the multiple coil metal spring unit at said release height; said core, when said composite spring unit is precompressed to said release height, having surface contact radially outwardly against said outer coil spring to enable said outer coil spring to house and confine said core against lateral outward bulging during lengthwise compression thereof; and said core having a substantially full length ever open central region accommodating radial inward flow of the core material occasioned by compression of the spring mechanism to the solid height of the outer coil spring.

2. In a draft gear for mounting in the draft pocket of a railway car, said pocket having front and rear stops, a casing having peripherally spaced transversely inwardly facing stationary friction surfaces therein and a cushioning mechanism within said housing to react between said front and rear stops and comprising a spring mechanism, an intermediate follower, and an energy absorbing friction clutch mechanism mounted in tandem with said spring mechanism for series action therewith and comprising a plunger having wedge shaped faces, friction shoes having wedge surfaces for engagement with the faces of said plunger and having friction surfaces for engagement with said first named friction surfaces, said first named friction surfaces being convergent in a direction toward said spring mechanism, said spring mechanism reacting through said intermediate follower to urge the wedge surfaces of said shoes against the wedge faces of said plunger for urging the shoes into transversely outward frictional engagement with said first named friction surfaces under forces proportional to the lengthwise forces applied to the gear, said shoes being movable longitudinally inwardly through the housing as the plunger is advanced during compression of the gear and longitudinally outwardly of the housing during release of the gear, said spring mechanism, when said arrangement is in release position, being precompressed to a predetermined extent to define a release height; said gear arrangement being of a type wherein said spring mechanism conventionally comprises a multiple coil metal spring unit including an outer coil spring having a free height substantially greater than said release height and having a solid height substantially less than said release height; the improvement wherein said spring mechanism comprise a composite spring unit including said outer coil spring and a tubular core of rubber-like material disposed in lengthwise relation within said outer coil spring and having a free height corresponding to the free height of said outer coil spring to provide said composite unit with a reaction force, at said release height, that is less than the reaction force of the multiple coil metal spring unit at said release height; said core, when said composite spring unit is precompressed to said release height, having surface contact radially outwardly against said outer coil spring to enable said outer coil spring to house and confine said core against lateral outward bulging during lengthwise compression thereof; and said core having a substantially full length ever open central region accommodating radial inward flow of the core material occasioned by compression of the spring mechanism to the solid height of the outer coil spring.

3. The arrangement of claim 1 wherein said intermediate follower means has a rearwardly extending central stem portion engageable in said core to stabilize said intermediate follower means against tipping, said stem portion being substantially shorter than the solid height of said coil spring to occupy only a minor portion of the ever open central region.

4. The arrangement of claim 2 wherein said intermediate follower means has a rearwardly extending circular portion engageable snugly in an end coil of said coil spring to center said intermediate follower means against transverse shifting, and said intermediate follower means having a rearwardly extending, rearwardly tapering stem portion centrally of said stem portion and engageable within said core to stabilize said intermediate follower means against tipping, said stem portion being substantially shorter than the solid height of said coil spring to occupy only a minor portion of the ever open central region.

5. In a draft gear, a longitudinally extending casing having an open end and a closed end and having a plurality of stationary friction surfaces therein adjacent said open end and extending in generally lengthwise slightly convergent relation towards said closed end, spring mechanism extending longitudinally in said casing and abutting the closed end thereof, a friction clutch mechanism in said casing at the open end thereof and including an externally actuatable, longitudinally movable plunger providing a front wedge, intermediate follower means abutting said spring mechanism and opposed to and longitudinally spaced from said front wedge and a plurality of wedge shoes each positioned between and in direct engagement with said front wedge and said intermediate follower means, said wedge shoes having outwardly facing friction surfaces cooperating with said stationary friction surfaces, said draft gear, when in release position, holding said spring mechanism precompressed to a predetermined extent to define a release height for said spring mechanism, said spring mechanism comprising an elongated tubular core of rubber-like material and an elongated helical coil spring encircling said core and extending coextensive therewith between said closed end and said intermediate follower means, said core and said coil spring each having a free height substantially greater than said release height, and said core, when said spring mechanism is precompressed to said release height, having surface contact radially outwardly against said coil spring to enable said coil spring to house and confine said core against lateral outward bulging during compression of said gear, said core having a substantially full length ever open central region accommodating radial inward flow of the core material occasioned by compression of the spring mechanism to the solid height of said coil spring, and said friction mechanism being actuated by relative longitudinal inward movement of said plunger and front wedge with respect to said casing and including means to produce correspondingly greater longitudinal inward movement of said intermediate follower means and spring mechanism in accordance with the convergence of said stationary friction surfaces such that said spring mechanism provides reaction to such plunger movement to establish longitudinal forces through said friction mechanism, with said friction mechanism translating a proportional amount of such longitudinal forces into lateral forces acting to load said wedge shoes against said stationary friction surfaces such that the closure resistance of said spring mechanism is multiplied in said friction mechanism.

6. In a draft gear, a longitudinally extending casing having an open end and a closed end and having a plurality of stationary friction surfaces therein adjacent said open end and extending in generally lengthwise slightly convergent relation towards said closed end, spring mechanism extending longitudinally in said casing and abutting the closed end thereof, a friction clutch mechanism in said casing at the open end thereof and including an externally actuatable, longitudinally movable plunger providing a front wedge, intermediate follower means abutting said spring mechanism and providing a rear wedge opposed to and longitudinally spaced from said front wedge and a plurality of wedge shoes each positioned between and in direct engagement with said front and rear wedges, said wedge shoes having outwardly facing friction surfaces cooperating with said stationary friction surfaces, said draft gear, when in release position, holding said spring mechanism precompressed to a predetermined extent to define a release height for said spring mechanism, said spring mechanism comprising an elongated tubular core of rubber-like material and an elongated helical coil spring encircling said core and extending coextensive therewith between said closed end and said intermediate follower means, said core and said coil spring each having a free height substantially greater than said release height, and said core, when said spring mechanism is precompressed to said release height, having surface contact radially outwardly against said coil spring to enable said coil spring to house and confine said core against lateral outward bulging during compression of said gear, said core having a substantially full length ever open central region accommodating radial inward flow of the core material occasioned by compression of the spring mechanism to the solid height of said coil spring, and said friction mechanism being actuated by relative longitudinal inward movement of said plunger and front wedge with respect to said casing to produce correspondingly greater longitudinal inward movement of said intermediate follower means, rear wedge and spring mechanism in accordance with the convergence of said stationary friction surfaces such that said spring mechanism provides reaction to such plunger movement to establish longitudinal forces through said friction mechanism, with said friction mechanism translating a proportional amount of such longitudinal forces into lateral forces acting to load said wedge shoes against said stationary friction surfaces such that the closure resistance of said spring mechanism is multiplied in said friction mechanism.

7. In a draft gear arrangement for mounting in the draft pocket of a railway car frame, said pocket having front and rear stops, said arrangement including a casing of a length substantially less than the distance between said stops and extending longitudinally in said pocket, a cushioning mechanism in said casing and reacting longitudinally between said stops through engagement with front and rear follower means, said cushioning mechanism including spring mechanism extending longitudinally in said casing and abutting one of said follower means, and said casing having a plurality of stationary friction surfaces therein adjacent said open end and extending in generally lengthwise slightly convergent relation towards said spring mechanism, said friction clutch mechanism including an externally actuatable, longitudinally movable plunger providing a front wedge, intermediate follower means abutting said spring mechanism and opposed to and longitudinally spaced from said front wedge and a plurality of wedge shoes each positioned between and in direct engagement with said front wedge and said intermediate follower means, said wedge shoes having outwardly facing friction surfaces cooperating with said stationary friction surfaces, said draft gear arrangement, when in release position, holding said spring mechanism precompressed to a predetermined extent to define a release height for said spring mechanism, said spring mechanism comprising an elongated tubular core of rubber-like material and an elongated helical coil spring encircling said core and extending coextensive therewith between said closed end and said intermediate follower means, said core and said coil spring each having a free height substantially greater than said release height, and said core, when said spring mechanism is precompressed to said release height, having surface contact radially outwardly against said coil spring to enable said coil spring to house and confine said core against lateral outward bulging during compression of said gear, said core having a substantially full length ever open central region accommodating radial inward flow of the core material occasioned by compression of the spring mechanism to the solid height of said coil spring, and said friction mechanism being actuated by relative longitudinal inward movement of said plunger and front wedge with respect to said casing and including means to produce correspondingly greater longitudinal inward movement of said intermediate follower means and spring mechanism in accordance with the convergence of said stationary friction surfaces such that said spring mechanism provides reaction to such plunger movement to establish longitudinal forces through said friction mechanism, with said friction mechanism translating a proportional amount of such longitudinal forces into lateral forces acting to load said wedge shoes against said stationary friction surfaces such that the closure resistance of said spring mechanism is multiplied in said friction mechanism.

8. The arrangement of claim 5 wherein said intermediate follower means has a rearwardly extending central stem portion engageable in said core to stabilize said intermediate follower means against tipping, said stem portion being substantially shorter than the solid height of said coil spring to occupy only a minor portion of the ever open central region.

9. The arrangement of claim 5 wherein said intermediate follower means has a rearwardly extending circular portion engageable snugly in an end coil of said coil spring to center said intermediate follower means against transverse shifting, and said intermediate follower means having a rearwardly extending, rearwardly tapering stem portion centrally of said stem portion and engageable within said core to stabilize said intermediate follower means against tipping, said stem portion being substantially shorter than the solid height of said coil spring to occupy only a minor portion of the ever open central region.

References Cited by the Examiner

UNITED STATES PATENTS

| 199,945 | 2/78 | Vose | 267—33 |
| 200,610 | 2/78 | Gardiner | 267—33 |
| 1,853,293 | 4/32 | Woernley | 213—33 |
| 1,930,701 | 10/33 | Tucker | 213—33 |
| 1,936,389 | 11/33 | Hallquist | 267—33 |
| 2,419,254 | 4/47 | Dath | 213—221 |
| 2,431,736 | 12/47 | Dath | 213—24 |

LEO QUACKENBUSH, *Primary Examiner.*